United States Patent [19]

Angell et al.

[11] Patent Number: 4,938,019

[45] Date of Patent: Jul. 3, 1990

[54] FUEL NOZZLE AND IGNITER ASSEMBLY

[75] Inventors: Fenton L. Angell, Novi; Theodore R. Koblish, Birmingham, both of Mich.

[73] Assignee: Fuel Systems Textron Inc., Walled Lake, Mich.

[21] Appl. No.: 423,653

[22] Filed: Oct. 18, 1989

Related U.S. Application Data

[63] Continuation of Ser. No. 109,580, Oct. 16, 1987, abandoned.

[51] Int. Cl.[5] .............................................. F02C 7/266

[52] U.S. Cl. .................................... 60/39.06; 60/748; 60/39.827

[58] Field of Search ................ 60/39.827, 748, 39.821, 60/39.06, 39.141

[56] References Cited

U.S. PATENT DOCUMENTS

| | | | |
|---|---|---|---|
| 2,459,286 | 1/1949 | Rabezzana et al. | 60/39.827 |
| 3,057,159 | 10/1962 | Benedict . | |
| 3,330,985 | 7/1967 | Johnston | 60/39.827 |
| 3,548,592 | 12/1970 | Hopkins | 60/39.827 |
| 3,684,186 | 8/1972 | Helmrich | 60/742 |
| 3,893,296 | 7/1975 | Fredriksen . | |
| 3,937,011 | 2/1976 | Carvel et al. | 60/748 |
| 3,980,233 | 9/1976 | Simmons et al. | 60/748 |
| 4,023,351 | 5/1977 | Beyler et al. | 60/748 |
| 4,215,979 | 8/1980 | Morishta . | |
| 4,412,810 | 11/1983 | Izuha et al. . | |

OTHER PUBLICATIONS

Gas Turbine Combustion, Arthur W. Lefebure, 1983, pp. 222–230.

Drawing #700–005, Oct. 22, 1973, Ex-Cell-O Corp.

*Primary Examiner*—Donald E. Stout

*Attorney, Agent, or Firm*—Reising, Ethington, Barnard, Perry & Milton

[57] ABSTRACT

An elongate igniter is disposed in the inner air chamber of an air blast nozzle coaxial with the longitudinal axis thereof such that the discharge tip of the igniter discharges a spark generally longitudinally downstream of the tip out of the path of swirling inner air flow and in the path of a reverse flow field of atomized fuel established downstream of the tip by relatively controlled inner and outer air swirl strengths.

19 Claims, 2 Drawing Sheets

FUEL NOZZLE AND IGNITER ASSEMBLY

This is a continuation of Ser. No. 109,580 filed on Oct. 16, 1987, now abandoned.

FIELD OF THE INVENTION

The invention relates to an air blast fuel nozzle and igniter assembly for use with a combustor of a gas turbine engine.

BACKGROUND OF THE INVENTION

A typical air blast nozzle used in the past to provide atomized fuel to the combustor of a gas turbine engine is described in the Helmrich U.S. Pat. No. 3,684,186 issued Aug. 15, 1972. Such air blast fuel nozzles utilize compressor discharge air in the form of an inner air flow and from the nozzle with a fuel flow intermediate the air flows to provide atomization and intermixing of fuel and air discharged from the nozzle face downstream thereof. The fuel nozzle disclosed in this patent does not include an igniter for igniting the fuel-air mixture.

The Hopkins U.S. Pat. No. 3,548,592 issued Dec. 22, 1970, discloses a combination fuel nozzle and spark plug for a gas turbine engine. The spark plug is disposed coaxially with the nozzle longitudinal axis within an annular gaseous fuel chamber therearound. Ports are provided to introduce air between the inner electrode of the spark plug and an outwardly spaced grounded electrode merely for cooling the electrodes and purging the space therebetween. The discharge tips of the electrodes protrude downstream of the nozzle face and the spark jumps across the electrode tips transverse to the longitudinal axis in the path of the cooling and purging air exiting from the spark gap.

The Fredriksen U.S. Pat. No. 3,893,296 issued July 8, 1975, illustrates a combustion liner having fuel and air premixing inside the liner upstream of a discharge throat. A central spark igniter extends through the liner and terminates in a discharge tip adjacent the discharge throat. Air is introduced and flowed around and along the igniter merely for cooling it. The spark gap extends between the lower end of the electrode to a surrounding tip of a liner support in the path of the cooling air.

The Morishita U.S. Pat. No. 4,215,979 issued Aug. 5, 1980, describes an ignition torch for a gas turbine engine wherein fuel and air are premixed upstream of the discharge tip of an electrode assembly. An off-axis fuel pipe extends through an annular air chamber that is disposed around the igniter. Fuel from the fuel pipe and air are mixed upstream of an annular wall in the air chamber by turbulence generated by air vents in the wall. The ignition torch is disposed on one side of the combustor of the gas turbine engine while fuel for normal operation is fed into another side of the combustor through a plurality of fuel injection ports in a rotating shaft. The igniter is recessed inside the torch body away from the high temperature combustor environment. 5 The Benedict U.S. Pat. No. 3,057,159 issued Oct. 9, 1962, discloses a rocket igniter having a central electrode along which propellant flows for discharge adjacent the discharge tip. The spark from the igniter is discharged in the path of flowing propellant.

The Izuha et al U.S. Pat. No. 4,412,810 issued Nov. 1, 1983, describes a pulverized coal burner having an off-axis igniter.

Treatice entitled *Gas Turbine Combustion* authored by Arthur W. Lefebvre and published in 1983 by McGraw-Hill Book Co.—Hemisphere Publishing Corp. at pages 222–230 discusses ignition performance of gas turbine engines. Different types of igniters, such as surface-discharge igniters are discussed. Location of the igniter along the centerline of the combustor liner adjacent to the fuel nozzle is also discussed. However, this location is said likely to cause the igniter face to become fouled by carbon deposits and damaged through over-heating.

SUMMARY OF THE INVENTION

The invention contemplates an air blast fuel nozzle and igniter assembly for use with the combustor of a gas turbine engine wherein an elongate igniter is disposed in the inner air chamber coaxially with the longitudinal axis thereof and terminates in a discharge end for discharging, when energized, an electrical spark discharge generally longitudinally downstream out of the path of the swirling inner air flow exiting the chamber and in the path of a flow field of a atomized fuel established in the combustor by the swirling inner air flow and swirling outer air flow from the nozzle face, whose swirl strengths are relatively controlled to this end.

The invention thus contemplates cooperatively locating the discharge end of the igniter in an air blast nozzle and a flow field of atomized fuel in the combustor to enhance ignition.

In a typical working embodiment of the invention, a fuel nozzle body includes an inner air chamber with an upstream air inlet, a downstream inner air discharge lip and inner air swirl means and further includes an outer annular air chamber with upstream air inlet, downstream outer air discharge lip and outer air swirl mean therebetween. An annular fuel chamber is disposed between the inner and outer air chambers and includes an annular fuel discharge lip between the discharge lips of the inner and outer air chambers.

The flow field of atomized fuel is positioned downstream of the igniter discharge end in the combustor, preferably spaced downstream a selected distance sufficient to prevent the flow field from impinging o the discharge end and subjecting it to excessive temperature and combustion products during normal combustor operation after light-off (after ignition), and to provide a pilot flow field or zone of atomized fuel amenable for ignition by the spark discharge generally longitudinally from the igniter discharge end. Location of the flow field is controlled by imparting relatively greater swirl strength to the inner air than to the outer air within certain controlled ratios at given inner and outer air flow areas at the nozzle discharge end.

The igniter is supported coaxially in the inner air chamber at the downstream end by a hub having inner air swirl vanes disposed in the inner air chamber. The upstream end of the igniter is supported, such as by threaded connection, by the nozzle body.

BEST MODE FOR PRACTICING THE INVENTION

Figures 1, 2:
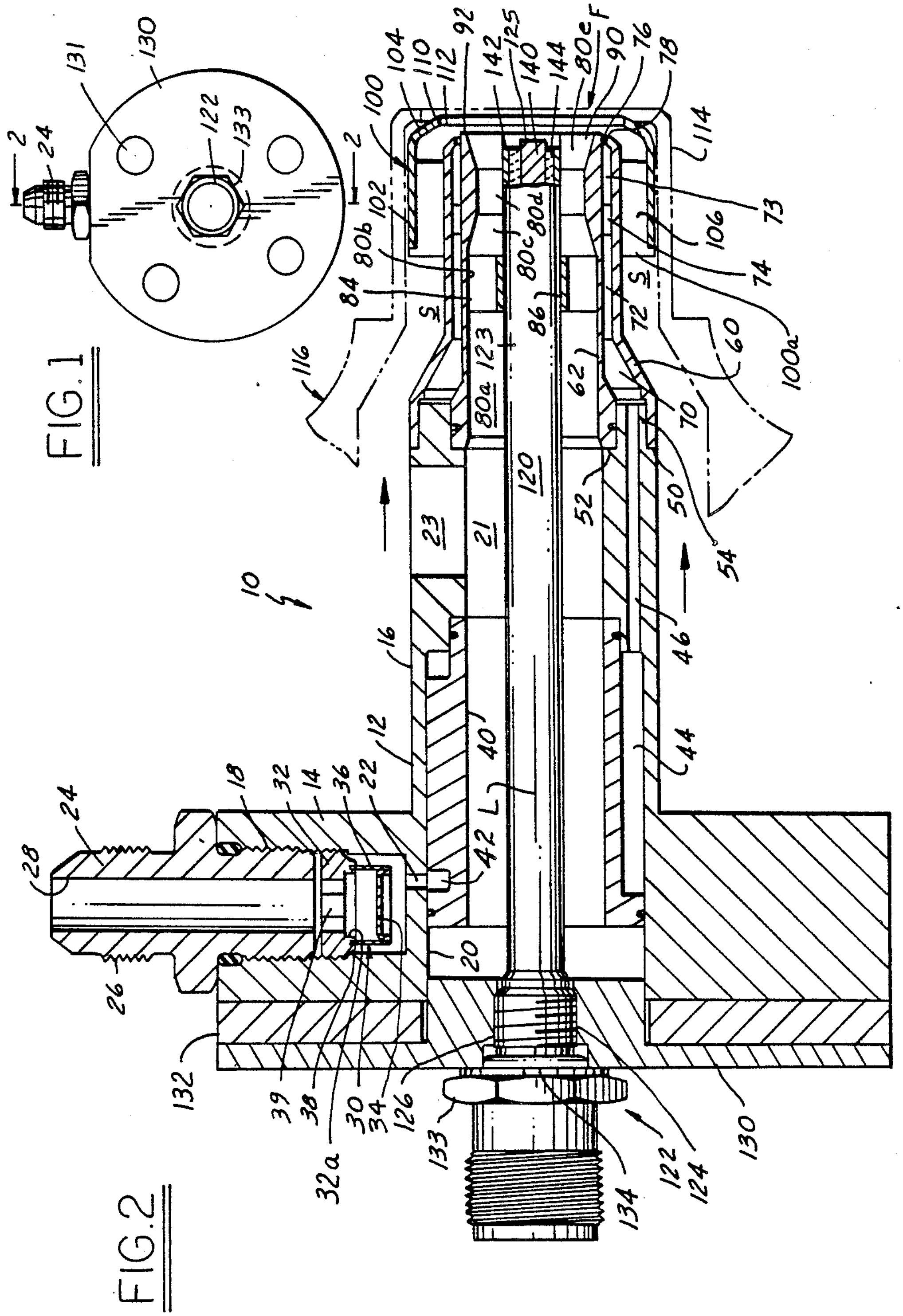
FIG. 1 is an upstream end elevation of the fuel nozzle and igniter assembly.
FIG. 2 is a longitudinal sectional view of the assembly taken along lines 2–2 of FIG. 1 and also of a portion of the liner (shown in phantom) forming the combustor of the gas turbine engine.

Referring to FIGS. 1 and 2, an air blast fuel nozzle and igniter assembly 10 constructed in accordance with the invention is shown. The assembly 10 includes a primary nozzle body 12 having an annular cylindrical transverse flange 14 and a hollow cylindrical sleeve 16 extending axially therefrom along and coaxial with a longitudinal axis L of the nozzle body.

The flange 14 includes a threaded transverse bore 18 extending from the flange circumference toward the large diameter cylindrical bore 20 therein. A small diameter bore 22 interconnects the bore 18 and bore 20.

Threadably engaged in the threaded bore 18 is a threaded male fitting 24. Fitting 24 includes an outer threaded portion 26 for connection to a fuel supply pipe fitting (not shown) itself connected to a conventional source of pressurized fuel (not shown). Fitting 24 includes fuel supply bore 28 along its length to convey incoming fuel to connector bore 22 through a fuel filter assembly 30. Filter assembly 30 includes a externally threaded support ring 32 threadably engaged in bore 18 as shown and a disc-shaped fuel filter element 34 and tubular fuel filter element 36. Filter element 36 is brazed at its upper end in FIG. 2 to a depending annular flange 32*a* on support ring 32.

Support ring 32 includes a central bore 39 through which fuel from bore 18 passes through filter 30 and then to connector bore 22.

A nozzle body insert 40 is shown positioned in large diameter bore 20 and is affixed therein by braze rings at opposite ends. The insert 40 includes an upstream annulus 42 in registry with connector bore 22 so as to receive fuel therefrom. Insert 40 includes a longitudinal or axial slot 44 connected to annulus 42 to convey fuel to one or more longitudinal or axial fuel passages 46 in nozzle body 12 as shown. When multiple fuel passages 46 are employed, they are circumferentially spaced around the nozzle body 12.

The downstream end of nozzle body 12 includes an outer annular shoulder 50 and inner annular shoulder 52 on opposite sides of cylindrical tubular wall 54.

A first outer tubular sleeve extension 60 is affixed to outer annular shoulder 50 and adjacent outer cylindrical surface of wall 54. A second inner tubular sleeve extension 62 is affixed to inner annular shoulder 52 and adjacent inner cylindrical surface of wall 54. These sleeve extensions may be affixed by brazing or other suitable techniques to respective shoulders 50,52.

Sleeve extensions 60,62 define therebetween an annular frusto-conical (in section) fuel receiving chamber 70 conveying fuel from passages 46 to downstream annular chamber 72 past fuel swirl vanes 74 for discharge out annular discharge orifice 76 defined by annular discharge lip 78. Swirl vanes 74 are spaced apart circumferentially between chamber 72 and chamber 73 and are inclined or canted at an angle relative to longitudinal axis L to impart swirl to the fuel as is known.

Sleeve extension 62 defines therewithin a series of cylindrical bores 80*a*–8*e* receiving inner air flow from bore 21 of nozzle body 12. Nozzle body 12 includes a plurality of circumferentially spaced air inlet openings 23 therethrough (only one shown) of cylindrical shape and extending transverse to the axis L to receive compressor discharge air.

Inner air flows from bore 21 to chamber 80*a* and past swirl vanes 84 in chamber 80*b* and then successively through chambers 80*c*, 80*d* and 80*e*. The swirl vanes 84 extend from a cylindrical tubular hub 86 and are attached to the inner wall of inner sleeve extension 62 by brazing or other conventional joining techniques. The swirl vanes 84 are circumferentially spaced apart and extend at a selected angle to the longitudinal axis L to swirl the inner air flow as explained below.

It is apparent that chambers 80*c*, 80*d*, 80*e* collectively establish a venturi throat for the inner air flow although the invention is not so limited. Chamber 80*e* diverges gradually outwardly or away from axis L toward the downstream end in a divergent frusto-conical shape or profile and forms an inner air discharge orifice 90 and annular discharge lip 92 for inner air.

Outer sleeve extension 60 is surrounded adjacent the downstream end by an outer air shroud 100 having a cylindrical tubular portion 102 and frusto-conical tubular portion 104. Outer shroud 100 is attached to the outer sleeve extension 60 by multiple outer air swirl vanes 106 extending therebetween and affixed to sleeve extension 60 by brazing or other conventional joining means. Vanes 106 are circumferentially spaced apart around the sleeve extension 60 and canted or oriented at a selected angle to the longitudinal axis L to swirl outer air flow as explained below.

Tubular portion 104 includes annular outer air discharge lip 110 defining outer air discharge orifice 112. As is apparent, the outer air discharge lip 110 is located longitudinally or axially downstream of inner air discharge lip 92 and radially or transversely outwardly relative thereto. Fuel discharge orifice 76 is located slightly longitudinally upstream of inner air discharge orifice 90 and outer air discharge orifice 112, although the invention is not so limited.

As will be explained further hereinbelow, the swirl strength of the inner air flow and outer air flow are relatively controlled by the inner and outer air chambers and their respective air swirl means and discharge lips to establish a flow field or zone Z of atomized fuel spaced downstream of the nozzle face F and correlated in position relative to the discharge end of the igniter plug 120 as explained below.

From FIG. 2, it is clear that outer air shroud 100 is received with slight clearance in an extension 114 of the combustor dome 116. It is also clear from that figure that air flow from the compressor (see arrows) is directed to the open upstream end 100*a* of the outer air shroud in the space S between the combustor dome and fuel nozzle body 16 and sleeve extension 60.

Disposed in the inner air chamber substantially coaxially with longitudinal axis L is an elongated cylindrical igniter 120. The upstream end 122 of the igniter includes a threaded portion 124 threadably received in threaded bore 126 in end cap 130. End cap 130 is fastened to flange 14 of nozzle body 12 by a plurality of machine screws 131, FIG. 1, with an annular spacer plate 132 between flange 14 and cap 130. Of course, cap 130 and spacer plate 132 may be provided as a one-piece or unitary member.

The upstream igniter end 122 includes a threaded nut 133 and locking washer 134 bearing against the end cap 130 to lock the position of the igniter in the nozzle. Of course, a source of high energy D.C. voltage supply (not shown) of conventional type is connected to the upstream end 122 to provide a high voltage between inner electrode 140 and outer grounded tubular electrode 142. Insulator 144 separates the electrodes 140,142 as shown in FIG. 2.

The igniter 120 is preferably a surface-discharge igniter plug operable at high voltage (e.g., at an energy level of 0.15 joules) commercially available from Champion Corporation, Toledo, Ohio.

The otherwise cantilevered downstream end 123 of the igniter extends through swirl vane hub 86 and is supported by the hub. The igniter end 123 is slidably supported in the hub so that the position of the igniter spark discharge end or tip 125 can be adjusted relative to the nozzle face F by threading the igniter into or out of end cap 130.

From FIG. 2, it is apparent that the transverse end or tip 125 of central electrode 140 is recessed or positioned axially upstream relative to the transverse inner air discharge lip 92 although the invention is not so limited.

Figure 3:
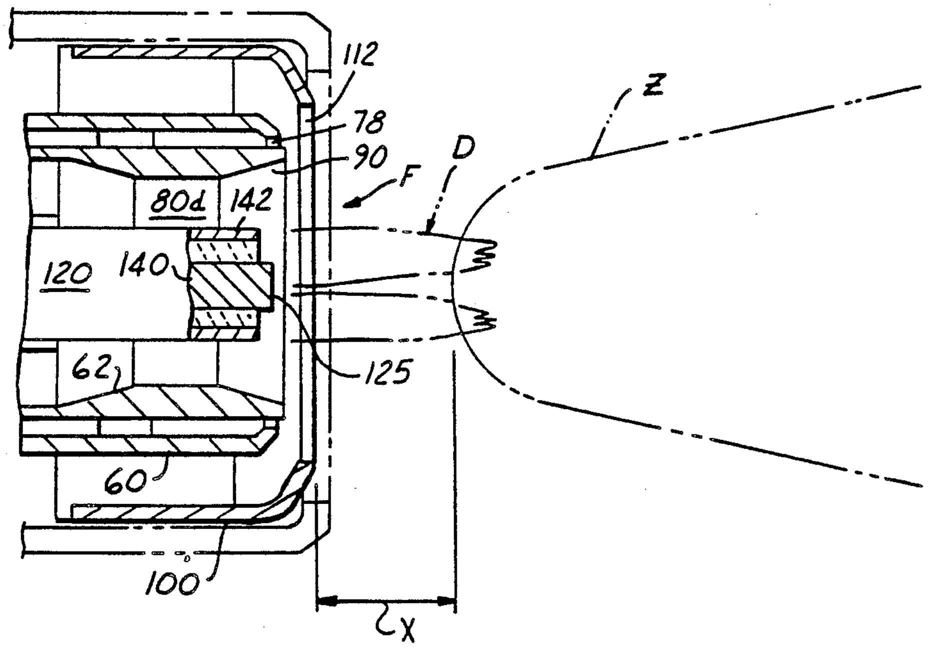
FIG. 3 is a schematic view of the igniter tip and its spark discharge relative to the reverse flow field of atomized fuel established downstream of the tip.

As illustrated in FIG. 3, the spark discharge D from the igniter end or tip 125 extends generally longitudinally therefrom as opposed to jumping or arcing transversely to one or more of the discharge lips 78, 92 or 110 in a direction transverse to axis L. That is, the spark discharge D does not propagate into the path of inner air discharging from inner air discharge lip 92. As a result, the spark discharge D is not subject to being blown away by the inner air flow from orifice 90 and is not subject to a quenching action by the inner air flow.

As mentioned hereinabove, the inner air flow and outer air flow are controlled to establish a pilot flow field or zone Z of finely atomized fuel and air preferably spaced downstream of the tip 125 in the combustor liner and in the longitudinal path of the spark discharge D so that ignition of the atomized fuel is effected.

The flow field or zone preferably is established a distance X downstream of tip 125 sufficiently close longitudinally to be in the path of the spark discharge and yet spaced sufficiently downstream away therefrom to prevent impingement of the flow field on the tip 125. In this way, combustion products in the field are not deposited on the tip to an adverse or harmful extent and the heat of the fireball or plasma ball formed upon ignition is reduced to reduce degradation of the tip by high temperatures of the plasma ball or envelope.

The flow field or zone is formed by reverse flow of the swirling inner and outer air in the combustor and the location of the field Z can be controlled by controlling the relative calculated swirl strengths of inner air and outer air discharging from the nozzle face in accordance with the equation:

SWIRL STRENGTH CALCULATION FOR HELICAL VANE SWIRLERS $$S_1' \text{ or } S_2' = \frac{G_\phi}{(G_x')R} = \frac{1}{(1-\psi)} \cdot \frac{1}{2} \cdot \frac{1-(R_H/R)^4}{1-(R_H/R)^2} \text{TAN}\alpha$$

WHERE:

$$\text{BLOCKAGE FACTOR } \psi = \frac{A_B}{A_T} = \frac{\frac{NT(R-R_H)}{\text{COS }\alpha}}{\pi(R^2-R_H^2)}$$

$A_T$=TOTAL FLOW AREA AVAILABLE FOR EACH OF INNER AIR FLOW AND OUTER AIR FLOW AT THE SWIRLER DISCHARGE $A_B$=VANE BLOCKAGE AREA

R=VANE TIP RADIUS $R_H$=VANE HUB RADIUS

N=NUMBER OF VANES

T=VANE THICKNESS $\alpha$=HELICAL ANGLE AT LEAD RADIUS R

REF:

$G_{100}$=ANGULAR MOMENTUM FLUX $G'_X$=AXIAL MOMENTUM FLUX LESS STATIC PRESSURE TERM $$S' = \frac{S_1'(A_T-A_B)_1 + S_2'(A_T-A_B)_2}{(A_T-A_B)_1 + (A_T-A_B)_2}$$

Where S' is the combined swirl number and $S_1'$ is calculated inner air swirl strength and $S_2'$ is calculated outer air swirl strength.

The above equations are found in reference entitled *Combustion Aerodynamics*, authored by Jim Beer and N.A. Chigier published 1983 by Robert E. Krieger Publishing Co., Malabar, Fla., at pages 111-112.

In particular, location of the flow field Z is controlled in desired position downstream of the nozzle face in the path of the spark discharge by maintaining the calculated inner air swirl strength number $S_1$, greater than the calculated outer air swirl strength number $S_2'$ when the combined swirl strength number S' is in the range of about 1.0 to about 1.22. Preferably, the inner air swirl number $S_1'$ is within about 0.666 to about 1.55 and the outer air swirl strength number $S_2'$ is within about 0.724 to about 1.53 when the combined swirl strength number S' is in the aforesaid range Even more preferred are a calculated inner air swirl strength number $S_1'$ of about 1.55 and outer swirl strength number $S_2'$ of about 1.06 for an inner air annular orifice inner radius of 0.156 inch and outer radius of 0.279 inch and an outer air annular orifice inner radius of 0.387 inch and outer radius of 0.524 inch when S' is within the aforesaid range. The above swirl strength numbers are calculated from the above equations and are not actual measured values.

The inner air flow and outer air flow discharging from lips 92 and 110 atomize and intermix with the liquid fuel discharging from the lip 78 downstream of the lips and, if relative swirl strength and area of the inner and outer air flows are properly controlled, establish the reverse flow field or zone Z longitudinally downstream of tip 125 for ignition by the spark discharge D.

As mentioned hereinabove, the spark discharge D does not cross the path of the inner air flow at the lip 92 as a result of the generally longitudinal direction of the spark. Instead, the flow field Z of intermixed air-atomized fuel is positioned by controlling inner and outer air flow swirl as described above to be in the path of the longitudinal spark discharge, i.e., spaced downstream of tip 125 in the combustor liner.

While the invention has been described by a detailed description of certain specific and preferred embodiments, it is understood that various modifications and changes can be made in them within the scope of the appended claims which are intended to include equivalents of such embodiments.

We claim:

1. An airblast fuel nozzle and igniter assembly for use with the combustor of a gas turbine engine comprising:

(a) nozzle body means forming an inner air chamber with a longitudinal axis and with an upstream air inlet, a downstream inner air discharge lip and inner air swirl means therebetween, an outer annular air chamber with an upstream air inlet, a downstream outer air discharge lip and outer air swirl means therebetween, and an annular fuel chamber between the inner air chamber and outer air chamber and having a downstream annular fuel discharge lip between the discharge lips of the inner air and outer air chamber, and (b) an elongate igniter disposed in the inner ai r chamber substantially coaxial with the longitudinal axis such that inner air swirls around the igniter and out the inner air discharge lip, said igniter terminating in a discharge end disposed longitudinally adjacent the inner air discharge lip for establishing, when energized, an electrical spark discharge generally longitudinally downstream of the discharge end out of the path of the swirling inner air flow from the inner air discharge lip and in the path of a flow field of atomized fuel established by inner air flow and outer air flow from the respective inner air discharge lip and outer air discharge lip so as to ignite the atomized fuel for engine starting.

2. The assembly of claim 1 wherein a portion of the igniter in proximity to the discharge end is supported by a hub having the inner air swirl means thereon.

3. The assembly of claim 1 wherein the nozzle body means includes means for providing an inner air swirl strength number greater than the outer air swirl strength number to locate the flow field downstream of the nozzle face in the path of the electrical spark discharge.

4. The assembly of claim 3 wherein the calculated combined swirl strength number S' for the inner air flow and outer air flow is within the range of about 1.0 to 1.22.

5. The assembly of claim 4 wherein the calculated inner air swirl number $S_1'$ is within the range of about 0.666 to about 1.55.

6. The assembly of claim 5 wherein the outer air swirl number $S_2'$ is within about 0.724 to about 1.53.

7. The assembly of claim 4 wherein the inner air swirl number $S_1'$ is about 1.55 and the outer air swirl number $S_2'$ is about 1.06.

8. A method for starting combustion in the combustor of a gas turbine engine comprising the steps of:

(a) discharging a swirling inner air flow and swirling outer air flow from a nozzle face while discharging a fuel flow from the nozzle face between the inner air flow and the outer air flow to establish a flow field in the combustor of atomized fuel downstream of the nozzle face and downstream of an igniter tip so disposed adjacent the nozzle face that the swirling inner air flow swirls peripherally about the igniter tip, and (b) establishing a spark discharge from the igniter tip generally longitudinally downstream of the igniter tip out of the path of the inner air flow as it swirls about the igniter tip and discharges from the nozzle face and in the path of the flow field of atomized fuel to ignite same.

9. The method of claim 8 wherein in step (a) inner air is discharged having a greater calculated swirl number than that of the outer air discharged.

10. The method of claim 9 wherein the discharging inner air and outer air has a calculated combined swirl strength number S' of about 1.0 to about 1.22.

11. The method of claim 10 wherein the calculated inner air swirl strength number $S_1'$ is about 0.666 to about 1.55.

12. The method of claim 11 wherein the calculated outer air swirl strength number $S_2'$ is about 0.724 to about 1.53.

13. An airblast fuel nozzle and igniter assembly for use with the combustor of a gas turbine engine, comprising:

(a) nozzle body means for forming an inner air chamber with a longitudinal axis and with an upstream air inlet, a downstream inner air discharge lip and inner air swirl means therebetween, an outer annular air chamber with an upstream air inlet, a downstream outer air discharge lip and outer air swirl means therebetween, and an annular fuel chamber between the inner air chamber and outer air chamber and having a downstream annular fuel discharge lip between the discharge lips of the inner air chamber and the outer air chamber, and (b) an elongate igniter disposed in the inner air chamber generally coaxial with the longitudinal axis such that inner air swirls around the igniter and discharges out the inner air discharge lip, said igniter terminating in a discharge end disposed longitudinally adjacent the inner air discharge lip and including inner and outer electrodes for establishing, when a voltage is applied therebetween, an electrical spark discharge propagating downstream of the inner air discharge lip and out of the path of the swirling inner air flow from said inner air discharge lip and in the path of a flow field of atomized fuel established by inner air flow and outer air flow from the respective inner air discharge lip and outer air discharge lip so as to ignite the atomized fuel for engine starting.

14. The assembly of claim 13 wherein a portion of the igniter in proximity to the discharge end is supported by a hub having the inner air swirl means thereon.

15. The assembly of claim 14 wherein the inner air chamber, outer air chamber, the respective inner and outer air swirl means and discharge lips include means for providing an inner air swirl strength number greater than the outer swirl strength number to locate the flow field spaced downstream of the nozzle face in the path of the electrical spark discharge.

16. A method for starting combustion in the combustor of a gas turbine engine comprising the steps of:

(a) discharging a swirling inner air flow and swirling outer air flow from a nozzle face while discharging a fuel flow from the nozzle face between the inner air flow and the outer air flow to establish a flow field in the combustor of atomized fuel downstream of the nozzle face and downstream of an igniter tip so disposed adjacent the nozzle face in an inner air chamber that the swirling inner air flow swirls peripherally about the igniter tip, and (b) applying a voltage between inner and outer electrodes on the igniter tip to establish a spark discharge propagating downstream from the igniter tip out of the path of the inner air flow as it swirls thereabout and discharges from the nozzle face and in the path of the flow field of atomized fuel to ignite same.

17. The method of claim 16 wherein in step (a) inner air is discharged having a greater swirl number than that of the outer air discharged.

18. An airblast fuel nozzle and igniter assembly for use with the combustor of a gas turbine engine comprising:

(a) nozzle body means forming an inner air chamber with a longitudinal axis and with an upstream air inlet, a downstream inner air discharge lip and inner air swirl means therebetween, an outer annular air chamber with an upstream air inlet, a downstream outer air discharge lip and outer air swirl means therebetween, and an annular fuel chamber between the inner air chamber and outer air chamber and having a downstream annular fuel discharge lip between the discharge lips of the inner air and outer air chamber, said inner air discharge lip, outer air discharge lip and fuel discharge lip establishing a nozzle face, and (b) an elongate igniter disposed in the inner air chamber substantially coaxial with the longitudinal axis such that inner air swirls around the igniter and out the inner air discharge lip, said igniter terminating in a discharge end disposed longitudinally adjacent the nozzle face for establishing, when energized, an electrical spark discharge generally longitudinally downstream of the discharge end out of the path of the swirling inner air flow from the inner air discharge lip and in the path of a flow field of atomized fuel established by inner air flow and outer air flow from the respective inner air discharge lip and outer air discharge lip so as to ignite the atomized fuel for engine starting.

19. An airblast fuel nozzle and igniter assembly for use with the combustor of a gas turbine engine, comprising:

(a) nozzle body means for forming an inner air chamber with a longitudinal axis and with an upstream air inlet, a downstream inner air discharge lip and inner air swirl means therebetween, an outer annular air chamber with an upstream air inlet, a downstream outer air discharge lip and outer air swirl means therebetween, and an annular fuel chamber between the inner air chamber and outer air chamber and having a downstream annular fuel discharge lip between the discharge lips of the inner air chamber and the outer air chamber, said inner air discharge lip, outer air discharge lip and fuel discharge lip establishing a nozzle face, and (b) an elongate igniter disposed in the inner air chamber generally coaxial with the longitudinal axis such that inner air swirls around the igniter and discharges out the inner air discharge lip, said igniter terminating in a discharge end disposed longitudinally adjacent the nozzle face and including inner and outer electrodes for establishing, when a voltage is applied therebetween, an electrical spark discharge propagating downstream of the nozzle face and out of the path of the swirling inner air flow from said inner air discharge lip and in the path of a flow field of atomized fuel established by inner air flow and outer air flow from the respective inner air discharge lip and outer air discharge lip so as to ignite the atomized fuel for engine starting.

* * * * *

UNITED STATES PATENT AND TRADEMARK OFFICE

CERTIFICATE OF CORRECTION

PATENT NO. : 4,938,019

DATED : July 3, 1990

INVENTOR(S) : Fenton L. Angell et al.

It is certified that error appears in the above-identified patent and that said Letters Patent is hereby corrected as shown below:

Column 3, line 65, delete "80a-8e" and insert --80a-80e--.
Column 6, line 7, delete "$G_{100}$" and insert --$G_{\phi}$--.
Column 6, line 10, after "PRESSURE TERM" insert --FOR SWIRLER COMBINATIONS:--
Column 6, line 32, after "range" insert --.--.

Signed and Sealed this

Sixth Day of July, 1993

Attest:

MICHAEL K. KIRK

Attesting Officer

*Acting Commissioner of Patents and Trademarks*